Jan. 13, 1970  A. N. GREENWOOD  3,489,918

HIGH VOLTAGE DIRECT CURRENT CIRCUIT BREAKER

Filed March 20, 1968

INVENTOR:
ALLAN N. GREENWOOD,
BY William Freedman
ATTORNEY

United States Patent Office 3,489,918
Patented Jan. 13, 1970

3,489,918
HIGH VOLTAGE DIRECT CURRENT CIRCUIT BREAKER
Allan N. Greenwood, Media, Pa., assignor to General Electric Company, a corporation of New York
Filed Mar. 20, 1968, Ser. No. 714,491
The portion of the term of the patent subsequent to Mar. 25, 1986, has been disclaimed
Int. Cl. H01h 9/30
U.S. Cl. 307—135                                    6 Claims

ABSTRACT OF THE DISCLOSURE

A high voltage D-C circuit breaker in which the usual smoothing capacitor connected across the terminal conductors of the D-C circuit is used for commutation purposes. The interrupting device is connected in one of the terminal conductors on the load side of the smoothing capacitor. Discharge of the capacitor for commutation purposes is initiated by the operation of normally-open circuit-making means connected across the terminal conductors on the load side of the interrupting device.

---

This invention relates to means for interrupting a high voltage direct-current circuit and relates, more particularly, to circuit interrupting means of the type in which a current zero is created by discharging a commutating capacitor through a circuit interrupting device.

In U.S. Patent 3,252,050—Lee, assigned to the assignee of the present invention, circuit interrupting means of this type is disclosed and claimed. In this circuit interrupting means a circuit interrupting device is connected in series with a source of high voltage D-C that supplies current through the interrupter to a load. Connected across the interrupter is a normally-open commutating circuit that includes a precharged commutating capacitor. When the D-C circuit is to be opened, the commutating circuit is closed, causing the capacitor to discharge through the interrupter and the commutating circuit, thereby forcing the current through the interrupter to zero. The introduction of this current zero gives the interrupter an opportunity to build up dielectric strength and complete the interruption.

The commutating capacitor in the circuit interrupting means of the aforesaid Lee patent is provided primarily, if not entirely, for the purpose of commutating the current through the interrupter, to facilitate interruption. In a typical high voltage D-C circuit, this separate capacitor is an expensive piece of apparatus; and a considerable saving can be realized, if this capacitor, along with any special charging means provided therefor, could be eliminated. In my application S.N. 533,366, filed Mar. 10, 1966, now Patent No. 3,435,288, and assigned to the assignee of the present invention, I have shown and claimed a circuit that requires no separate charging means for the commutating capacitor; and the use of this latter circuit permits a substantial cost reduction to be made through elimination of such charging means. But this circuit still requires a separate commutating capacitor for the circuit interruption.

An object of my present invention is to provide a high voltage D-C circuit breaker of this general type in which I eliminate the need for a separate commutating capacitor and any special charging means therefor.

Another object is to reduce the voltage duty on the interrupting device during the interrupting operation.

In carrying out my invention in one form, I rely for commutating purposes on the usual smoothing capacitor that is used in conjunction with the D-C source. A pair of terminal conductors connect the load across the source terminals, and the smoothing capacitor is connected between these terminal conductors. The interrupting device is connected in one of the terminal conductors on the load side of the smoothing capacitor; and normally-open circuit-making means is connected between the terminal conductors on the load side of the interrupting device. When the interrupting device is operated to initiate circuit interruption, the normally-open circuit-making means is closed to discharge the capacitor through the interrupting device. The resulting discharge current is an oscillatory current that quickly forces the total current through the interrupting device to zero, thus providing the interrupting device with an opportunity to complete the interruption.

For a better understanding of the invention, reference may be had to the following description taken in conjunction with the accompanying drawing, wherein.

Figure 1:
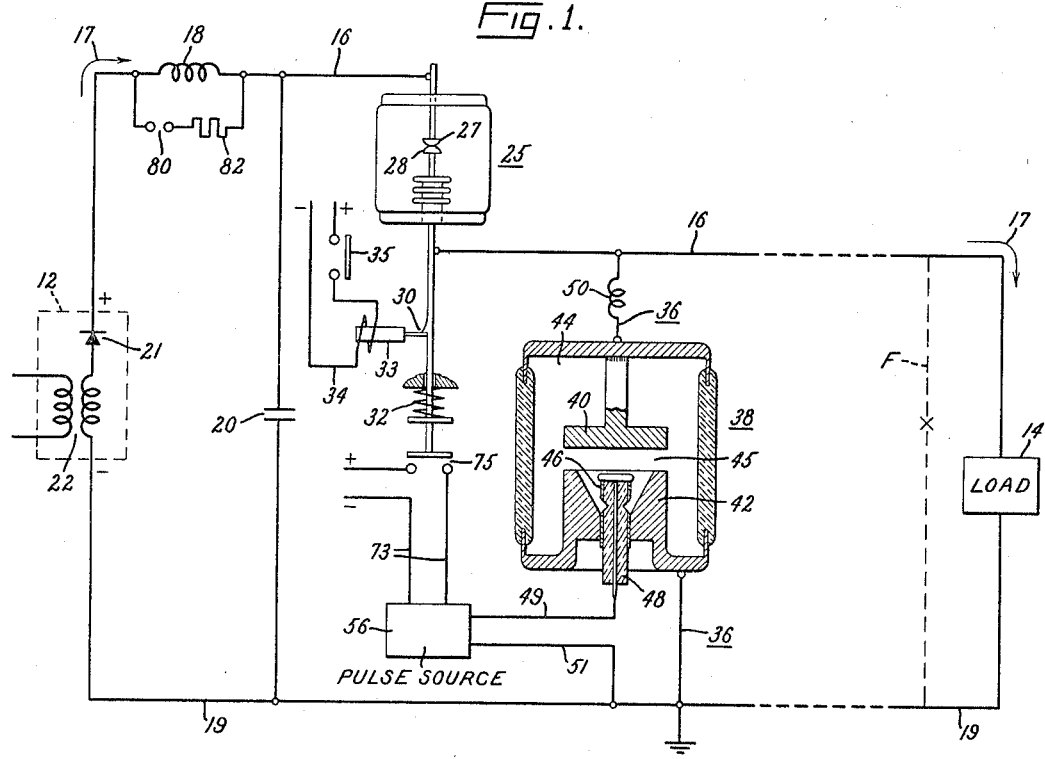
FIG. 1 is a diagrammatic showing of one form of my circuit interrupting arrangement.

Referring to FIG. 1, there is schematically shown a high voltage D-C system comprising a source 12, a load 14, and terminal conductors 16 and 19 connecting the load across the terminals of the source. It will be assumed that normal load current flows in the direction indicated by arrows 17, flowing to the load through the high voltage terminal conductor 16 and returning to the source through grounded return conductor 19. The source 12 is schematically depicted as comprising a transformer 22 and a rectifier 21 connected in series with the secondary winding of the transformer. Connected in the high voltage terminal conductor 16 and in series with source 12 and load 14 is the usual smoothing reactor 18 which acts to smooth the current output from the source.

Connected across terminal conductor 16 and 19 adjacent the source is a large capacitor 20 which cooperates with the smoothing reactor to aid in smoothing the current output from the source. Capacitor 20 also acts to reduce the steepness of any voltage surges on the lines 16, 19 and cooperates with the reactor 18 to form a radio-frequency filter. This capacitor is a conventional part of most high voltage D-C systems.

For controlling the flow of current to the load 14, a circuit interrupter 25 is connected in terminal conductor 16 in series with load 14 and smoothing reactor 18. Interrupter 25 is located on the load side of the smoothing capacitor 20. In a preferred embodiment of my invention, the circuit interrupter 25 is a vacuum-type circuit interrupter such as shown in my aforesaid application S.N. 533,366. Since the details of such an interrupter are conventional, they have not been shown. The interrupter is schematically depicted as comprising a stationary contact 27 and a movable contact 28, releasably held in its closed position by a latch 30. The contact 28 is biased downwardly toward open position by a suitable opening spring 32. Latch 30 is controlled by a tripping solenoid 33 connected in a tripping circuit 34. When circuit 34 is completed by a suitable switch 35, which can be operated manually or in response to predetermined electrical conditions, such as overcurrent in line 16, the tripping solenoid is energized to release latch 30. When latch 30 is released, spring 32 drives movable contact 28 downwardly to produce a gap between the contacts. This contact separation establishes an arc across the gap which is quickly extinguished and prevented from reigniting, thus interrupting the circuit, all in a manner soon to be described in greater detail.

To interrupt a D-C circuit, it is necessary first to force the current to zero and then to prevent arc reignition. One way of forcing the current to zero is by forcing a locally controlled commutating current through the interrupter in opposition to the load current. This is the general approach used in the illustrated interrupting arrangement. Heretofore, this commutating current has been derived from a separate, precharged commutating capacitor connected across the contacts of the interrupter 25. Instead of using such a separate commutating capacitor, I rely upon the smoothing capacitor 20 for supplying this commutating current. This smoothing capacitor, being directly connected across the terminals of the source, is always charged to a high energy level during normal operation of the system. Since the smoothing capacitor 20 is quite large, its discharge from its normal condition produces a commutating current that is more than ample to drive even the highest fault currents rapidly to zero.

For discharging the smoothing capacitor in order to effect interruption, I provide a discharge circuit 36, which is connected across the terminal conductors 16, 19 on the load side of the interrupter 25 closely thereadjacent. This discharge circuit 36 comprises circuit making means in the form of a triggered vacuum gap device 38 and an inductance 50, soon to be described, shown in series with gap device 38. Circuit-making means 38 is normally open, but when it is closed, it completes the discharge circuit 36, thereby connecting the discharge circuit across the terminals of smoothing capacitor 20 through the circuit interrupting device 25. This circuit comprising capacitor 20 and inductance 50 connected thereacross is an oscillatory circuit, and the resulting discharge current is a relatively high frequency oscillatory current that is super-imposed on the D-C current then flowing through terminal conductors 16, 19. When the capacitor initially discharges, the discharge current rapidly builds up to a positive peak and then oscillates toward a negative peak. This oscillation toward the negative peak results in capacitor discharge current being forced through the interrupter in opposition to the load or fault current, thereby driving the total current to zero. This relationship of the currents is illustrated in FIG. 3 of my aforesaid application S.N. 533,366.

In a preferred form of the invention, circuit interruption is effected by first separating contacts 27, 28 to draw an arc therebetween. At a predetermined instant thereafter, the circuit-making means is effectively closed to complete discharge circuit 36, causing capacitor 20 to rapidly discharge through the arc and the discharge circuit 36. The resulting oscillatory discharge current forces the arcing current to zero, as described hereinabove. When this occurs, the arc between the contacts is extinguished and dielectric strength is built up between the contacts sufficiently rapidly to withstand the recovery voltage, thereby interrupting the circuit.

In FIG. 1, the normally-open circuit-making means 38 is illustrated as being a triggered vacuum gap device of the general type shown and claimed in U.S. Patent 3,087,092—Lafferty, assigned to the assignee of the present invention. Such a gap device comprises a pair of spaced apart main electrodes 40 and 42 disposed in a highly evacuated chamber 44 and defining a main gap 45 therebetween. Disposed adjacent one main electrode 42 is a trigger electrode 46 defined by a metal film on a ceramic supporting rod 48. Film 46 can be of hydrogen-impregnated titanium or of a suitable gas-free metal, such as copper. Ceramic rod 48 is disposed coaxially of main electrode 42 and is suitably sealed to a main electrode 42 about its outer periphery. A portion of the ceramic rod 48 is uncoated and defines a trigger gap along this uncoated surface that electrically isolates trigger electrode 46 from main electrode 42 under normal conditions. A conductive connection 49 extends through ceramic rod 48 and across its upper end surface to trigger electrode 46.

When an electric pulse is applied between trigger electrode 46 and main electrode 42, the trigger gap breaks down, and the resulting spark liberates a small quantity of vapor or gas from the trigger electrode 46. This vapor or gas is quickly ionized and projected into main gap 45, thus lowering its dielectric strength and initiating a breakdown of the main gap. When the main gap 45 thus breaks down, the commutating capacitor 35 can discharge through circuit 36 via the arc between contacts 27, 28 in the manner described hereinabove to force the current through the interrupter 25 to zero.

When the current in the commutating circuit 36 finally reaches zero, a high dielectric strength is automatically established across the main gap 45 of gap device 38, and gap device 38 is thus restored to its original normally-open condition.

The above-described pulse across the trigger gap is derived from any suitable conventional pulse source such as schematically shown at 56 connected in a control circuit 49, 51 that extends between the trigger electrode and the main electrode. This pulse source 56 is rendered operative by completion of a control circuit 73. Control circuit 73 is completed in response to movable contact 28 of the interrupter 25 reaching a predetermined position in its opening stroke. At this predetermined position, a normally-open control switch 75 is closed thereby completing control circuit 73, thus causing the trigger pulse to be applied to the trigger gap and close the circuit-making means 38.

Although FIG. 1 shows a fixed electrode triggered vacuum gap being used for circuit-making means 38, it will be apparent that other forms of switching devices could instead be used. For example, I could use a normally-open switch comprising relatively-movable electrodes and suitable means for operating its electrodes to closed position when main interrupter 25 has been opened to a predetermined extent and for subsequently separating said electrodes at a suitable time after the interrupting operation has been completed.

Figure 2:
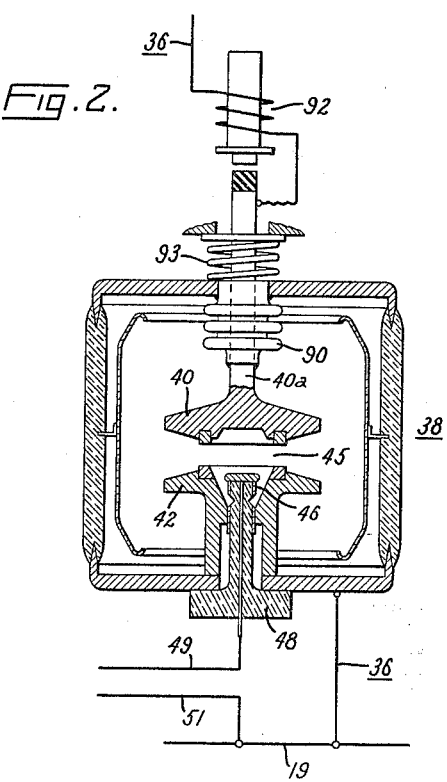
FIG. 2 is a schematic showing of a modification for a part of the interrupting arrangement of FIG. 1.

As another example, I could use for the circuit making means 38 a triggered vacuum gap device having movable, instead of fixed, electrodes. An example of such a gap device is schematically depicted in FIG. 2, where I show a gap device corresponding to that shown and claimed in U.S. Patent 3,319,121—Lee, assigned to the assignee of the present invention. FIG. 2 contains reference numerals corresponding to those used for similar parts in device 38 in FIG. 1. The main respect in which the device 38 of FIG. 2 differs from that of FIG. 1 is that electrode 40 of FIG. 2 is movable instead of fixed, and a flexible bellows 90 is provided about the electrode support rod 40a to provide a seal thereabout. When the main gap 45 of normally-open device 38 is arced-over following spark-over of the trigger gap, as above described, the resulting current between electrodes 40 and 42 passes through an electroresponsive closing device, e.g., solenoid 92, to drive electrode 40 into engagement with 42. This extinguishes the arc between the electrodes and allows the continuing current to pass through the engaged electrodes. The electrodes remain in engagement until the current subsides to a predetermined level, at which time the compressed spring 93 separates the contacts to open commutating circuit 36 and return the device 38 to its normal, open position of FIG. 2.

The device shown in FIG. 2 is actually a preferred form of circuit-making device for this application because it has the ability to carry currents of long duration without damage, thanks to extinguishment of the arc through contact engagement. Under certain interrupting conditions, current must flow through the circuit-making device 38 for a relatively long period following initial arc-over in order to permit the energy in the power circuit 16, 19 on the load side of interrupter 25 to be completely dissipated.

It will be apparent that by utilizing the smoothing capacitor 20 for commutating purposes, I have eliminated the need for a separate commutating capacitor connected across the interrupter, such as heretofore used. Also, the need for special charging means for the commutating capacitor has been eliminated since my capacitor is always connected across the terminals of the source 12, thus remaining charged and in readiness to supply commutating current whenever the need arises.

When the current through interrupter 25 has been driven to zero by discharging capacitor 35 therethrough, a recovery voltage builds up across the interrupter, as hereinabove pointed out. A major component of this recovery voltage results from the energy stored in the reactor 18 charging capacitor 35 as soon as the current is driven to zero. I limit the peak value and frequency of this recovery voltage by connecting across reactor 18 an energy-dissipating circuit 80, 82 corresponding to a similar circuit shown and claimed in the aforesaid Lee Patent 3,252,050. This energy-dissipating circuit comprises the series combination of a normally-open gap device 80 and a suitable resistor 82. Gap device 80 breaks down when the voltage across reactor 18 reaches a predetermined value during the buildup of recovery voltage, thus connecting the resistor across the reactor terminals. This diverts current from the reactor into the energy-dissipating circuit 80, 82 thus effectively reducing the current into capacitor 20, thereby reducing the frequency and peak value of the voltage developed across capacitor 20 and correspondingly across interrupter 25.

In the above discussion I refer to dissipating the energy stored in the power circuit on the source side of the interrupter. There can also be energy stored in the power circuit on the load side of the interrupter which must be dissipated immediately following interruption. In this regard, assume that the circuit interrupter has opened in response to a fault, such as depicted at F, effectively shorting out the load 14. The inductance of the power circuit on the load side discharges its energy through the fault path, and in so doing, tends to drive the voltage at the load terminal of the interrupter in a negative direction. However, I have effectively prevented this load terminal voltage from being driven substantially negative by connecting this load terminal directly to ground through the then conducting gap device 38.

The voltage appearing across the separated contacts of the interrupter immediately following current zero is equal to the difference between (1) the voltage (between conductors 16 and 19) on the source side of the interrupter, and (2) the voltage (between conductors 16 and 19) on the load side, these two voltages being of opposite polarity. Since the voltage between conductors 16 and 19 on the load side is limited to substantially zero by the presence of the short circuit through gap device 38, the voltage across the interrupter is constituted primarily by the voltage across conductors 16 and 19 at the source terminals of the interrupter. Thus, it will be apparent that the effective short circuit formed by the circuit-making means 38 between conductors 16 and 19 at the load terminal of the interrupter during this interval effectively reduces the voltage duty on the interrupter.

Had the commutating capacitor been connected directly across the circuit interrupter, as in prior designs, then the commutating capacitor would also be subjected to a voltage which is the difference between items (1) and (2) in the immediately preceding paragraph. But since one terminal of the commutating capacitor is directly connected to ground in my arrangement, only the voltage designated 1 in the immediately preceding paragraph appears thereacross, thus reducing the voltage duty on the commutating capacitor.

In those applications where a relatively long time is needed to dissipate the energy of the power circuit on the load side of the interrupter, an engageable contact device, such as shown in FIG. 2, is preferably used for the circuit making means 38 so as to prevent this long duration current from damaging the circuit making means.

Another advantage of my arrangement is that traveling wave effects on a faulted line are decoupled from a circuit breaker by the applied short circuit through gap device 38 on the load terminal of the breaker. This decoupling makes the duty on the circuit breaker much easier to predict and test for.

Still another advantage of my arrangement is that the control 56, 49, 51 for the triggered vacuum gap of FIG. 1 or FIG. 2 can be at or close to ground potential, thus simplifying and reducing the cost of its insulation. In this respect, note that this control 56, 49, 51 is connected to ground through the lead 51.

Although single break devices 25 and 38 are shown in the drawing for simplicity, it is to be understood that, for higher voltages, devices with multiple breaks in series will be used.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. Means for interrupting a high voltage D-C circuit that comprises a source, a load, a high voltage terminal conductor and a ground potential terminal conductor connecting said load across the terminals of said source, and a smoothing capacitor connected across said terminal conductors, comprising:
  (a) a circuit interrupter connected in said high voltage terminal conductor on the load side of said capacitor and comprising relatively movable contacts connected in series with said source and said load,
  (b) means for normally maintaining said contacts in engagement to enable load current to flow therethrough,
  (c) arc-initiating means for separating said contacts to draw an arc therebetween,
  (d) normally-open circuit-making means connected by a substantially non-resistive circuit across said terminal conductors on the load side of said circuit interrupter and closable to connect the series combination of said circuit interrupter and said circuit-making means across the terminals of said smoothing capacitor, and
  (e) means for forcing the current through said arc to zero comprising means for closing said circuit-making means upon initiation of said arc to discharge said capacitor through the series combination of said arc and said circuit-making means.

2. Apparatus of claim 1 in which closing of said circuit-making means establishes an effective short circuit between the load terminal of said circuit interrupter and ground through a path independent of any fault path on the high voltage D-C circuit.

3. The apparatus of claim 1 in which said circuit-making means comprises a triggered gap device that includes a main gap and a trigger gap, said means for closing said circuit-making means comprising control means for sparking over said trigger gap to render said main gap conductive.

4. The apparatus of claim 3 in which:
  (a) said triggered gap device comprises a pair of relatively-movable main electrodes that are normally spaced-apart to define said main gap therebetween,
  (b) means is provided for driving said main electrodes into engagement immediately following said main gap's being rendered conductive,
  (c) and means is provided for separating said main electrodes after the current therethrough has subsided to a predetermined level.

5. The apparatus of claim 4 in which said control means comprises a pair of leads between which a triggering pulse is applied to said trigger gap, one of said leads being maintained at substantially ground potential.

6. The apparatus of claim 1 in which said circuit-making means comprises a triggered gap device that includes a main gap and a trigger gap, said means for closing said circuit-making means comprising control means for sparking over said trigger gap to render said main gap conductive, said control means comprising a pair of leads between which a triggering pulse is applied to said trigger gap, one of said leads being maintained at substantially ground potential.

References Cited

UNITED STATES PATENTS

| | | | |
|---|---|---|---|
| 2,595,024 | 4/1952 | Toulon | 307—136 |
| 3,309,570 | 3/1967 | Goldberg. | |
| 3,376,475 | 4/1968 | Greber. | |

ROBERT K. SCHAEFER, Primary Examiner

T. B. JOIKE, Assistant Examiner

U.S. Cl. X.R.

317—11